United States Patent
Megas et al.

(10) Patent No.: US 7,174,707 B2
(45) Date of Patent: Feb. 13, 2007

(54) REGENERATION OF A FILTER BY THE USE OF A TONE GENERATOR

(75) Inventors: Lucas Megas, Göteborg (SE); Astrid Drewsen, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 10/248,001

(22) Filed: Dec. 9, 2002

(65) Prior Publication Data

US 2003/0136117 A1 Jul. 24, 2003

Related U.S. Application Data

(63) Continuation of application No. PCT/SE01/01273, filed on Jun. 7, 2001.

(30) Foreign Application Priority Data

Jun. 9, 2000 (SE) .................................. 0002186

(51) Int. Cl.
*F01N 3/00* (2006.01)
(52) U.S. Cl. .................. 60/297; 60/274; 60/275; 60/295; 60/311; 422/186.1; 422/186.16; 55/292; 55/293
(58) Field of Classification Search ................ 60/274, 60/275, 295, 297, 300, 303, 311, 312; 422/186.1, 422/186.16, 186.29; 55/DIG. 30, 292, 293
See application file for complete search history.

(56) References Cited

U.S. PATENT DOCUMENTS

| | | | | |
|---|---|---|---|---|
| 3,776,364 A | * | 12/1973 | Van Doeren ................ | 181/228 |
| 4,615,173 A | | 10/1986 | Usui et al. ................... | 60/286 |
| 4,825,651 A | * | 5/1989 | Puschner et al. ............. | 60/275 |
| 4,864,821 A | * | 9/1989 | Hoch .......................... | 60/274 |
| 4,875,335 A | | 10/1989 | Arai et al. ................... | 60/274 |
| 5,180,559 A | * | 1/1993 | Ma ............................. | 422/168 |
| 5,353,721 A | * | 10/1994 | Mansour et al. ............ | 110/345 |

FOREIGN PATENT DOCUMENTS

| | | | | |
|---|---|---|---|---|
| JP | 05-018226 | * | 1/1993 | ................... 60/275 |
| JP | 06-212945 | * | 8/1994 | ................... 60/275 |
| JP | 8177462 A | | 7/1996 | |
| SE | 463529 B | | 12/1990 | |

* cited by examiner

*Primary Examiner*—Binh Q. Tran
(74) *Attorney, Agent, or Firm*—Novak Druce & Quigg, LLP

(57) ABSTRACT

Method and arrangement for a combustion engine having an exhaust pipe, and a particle filter located in the exhaust pipe including a membrane which is permeable to gas components generated by a combustion process in the combustion engine but impermeable to soot and ash particles generated by the same combustion process, and also a method for cleaning such a filter.

20 Claims, 2 Drawing Sheets

REGENERATION OF A FILTER BY THE USE OF A TONE GENERATOR

CROSS REFERENCE TO RELATED APPLICATIONS

This application is a continuation patent application of International Application No. PCT/SE01/01273 filed 7 Jun. 2001 which was published in English pursuant to Article 21(2) of the Patent Cooperation Treaty, and which claims priority to Swedish Application No. 0002186-5 filed 9 Jun. 31 May 2000. Both applications are expressly incorporated herein by reference in their entireties.

BACKGROUND OF INVENTION

1. Technical Field

The present invention relates to a combustion engine that includes an exhaust pipe and a particle filter located therein. More particularly, the invention relates to a combustion engine having an exhaust pipe, a particle filter located in the exhaust pipe, and means for cleaning the filter. Furthermore, the invention relates to a method for cleaning a particle filter located in an exhaust pipe associated with a combustion engine.

2. Background of the Invention

Today's vehicle industry strives to utilize combustion engines that comply with higher and higher demands for purity of the emissions produced by the combustion processes that take place inside the engines. Particularly where combustion processes in diesel engines are concerned, soot and ash particles are one type of such emissions. In order to reduce the occurrence of soot and ash particles in the exhaust gases that are ultimately emitted into the ambient environment, particle filters can be installed in the exhaust pipe. The particle filters typically take the form of mechanical filters and, in principle, function as a screen that allows passage of certain exhaust gas components, for example, carbon dioxide and water, but which prevents the passage of soot and ash particles. This means that the soot and the ash particles will gradually form a deposit on the filter, which makes passage of the exhaust gases more difficult and results in an increase in back pressure at the filter. This also results in an increase of the fuel consumption of the vehicle. Should the process be allowed to proceed, the particle quantity finally becomes so large that the engine ceases to function. A traditional method for ensuring that the back pressure remains at an acceptable level is to replace the filter at regular intervals. In a combustion engine having a cylinder volume of seven liters, approximately one liter of particulate is produced over the course of approximately 70,000 kilometers (approximately 43,500 miles) of driving when operating on normal fuels. This means that filter replacement has to take place at relatively frequent intervals, something which might be perceived as awkward since it its desirable that vehicle service intervals not be too frequent.

Therefore, in order to increase the service life of the filter, it is desirable that the filter be cleaned in some way without having to dismantle the filter from the exhaust pipe. In this regard, trials have been performed with catalytic filters that are intended to perform catalytic combustion of the soot particles. This type of process, however, does not remove the ash deposit from the filter surface. Furthermore, as a result of the heat generated in the catalytic combustion process, there is a risk that the ash forms a cement-like material on the filter surface.

SUMMARY OF INVENTION

An object of the present invention is to provide a combustion engine that includes an exhaust pipe with a particle filter located therein, and in which cleaning of the particle filter of soot and ash particles is possible without having to remove the filter from the exhaust pipe.

This object is achieved by means of connecting a tone generator to the exhaust pipe that establishes an oscillating air stream through the filter. The oscillating air stream releases soot and ash particles from the filter and which are then transported away.

Another purpose or object of the invention is to provide a method for cleaning a particle filter located in an exhaust pipe associated with a combustion engine. This purpose is achieved by means of a method in which, as a result of the tone generator generating an oscillating air stream, soot and ash particles are released from the filter by an infrasonic sound, and can then be transported away from the filter.

BRIEF DESCRIPTION OF DRAWINGS

In the following, the invention will be described in greater detail by means of an embodiment, and with reference to the attached drawings, in which.

DETAILED DESCRIPTION

Figure 1:
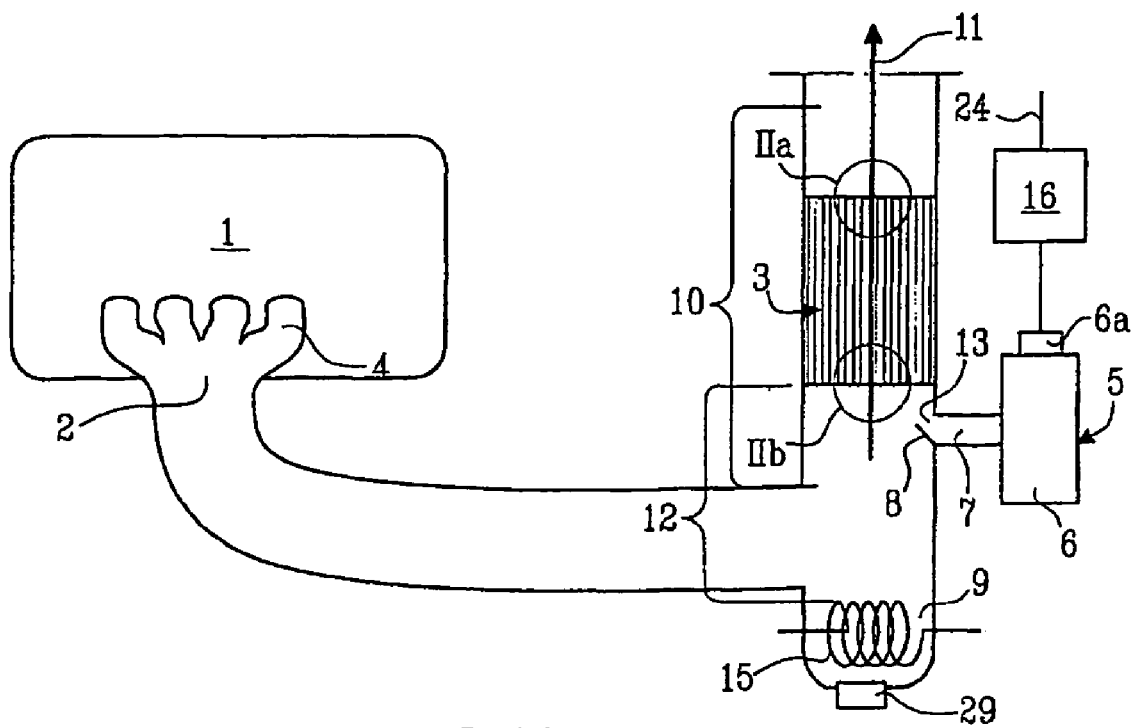
FIG. 1 is a schematic representation of a combustion engine having an exhaust pipe and a filter located in that exhaust pipe.

FIG. 1 shows a schematic representation of a combustion engine 1 including an exhaust pipe 2 and a particle filter 3 located in the exhaust pipe. The combustion engine itself is of conventional design, and will therefore not be described in any greater detail. Whenever applicable, the exhaust pipe is denoted as including an exhaust manifold 4 which connects the outlets from the respective cylinders of the combustion engine 1 to the exhaust pipe 2. The exhaust pipe 2 can be of a conventional type and, whenever applicable, can be equipped with one or more exhaust gas turbines for operating one or more compressors located at the inlet port (s) of the combustion engine. Furthermore, when suitable, catalytic reaction chambers can also be placed in the exhaust pipe 2.

A tone generator 5 is installed in connection with the exhaust pipe 2. The tone generator 5 that generates an oscillating air stream having a low frequency is directed into the exhaust pipe 2, preferably in a direction towards the filter. In a preferred embodiment, such as the example shown in FIG. 1, the tone generator 5 includes a loudspeaker 6a that is in communication with a resonance chamber 6 from which a wave-guide 7 communicates with the exhaust pipe. In a complimentary aspect and also a preferred embodiment of the invention, a reflector 8 can be installed in the exhaust pipe in order to direct the air stream or sound even more towards the filter. In order to ensure that the sensitive loudspeaker 6a of the tone generator 5 is not exposed to too much heat generated in the exhaust pipe under normal operating conditions, the wave-guide 7 can be cooled down, for example by means of cooling flanges installed around the wave-guide 7.

In order to prevent the reflector 8 from guiding particles into the wave-guide 7, the reflector 8 can be provided with cavities or slits close to the attachment of the reflector to the outlet from the wave-guide 7 or, depending on the installation of the reflector, to the wall of the exhaust pipe. In this way, particles are able to fall down along the reflector 8, then pass through the slits or cavities, and finally be collected in collecting vessel 9. In a preferred embodiment, the reflector includes a valve that is intended to open and close the wave-guide 7, thereby making it possible to also have an undisturbed flow inside the exhaust pipe 2 during normal operation.

In a preferred embodiment, a collecting vessel 9 for released soot and ash particles is placed in the exhaust pipe 2 upstream of, and in direct connection or communication with the filter 3. In this respect, "upstream" means inside the exhaust pipe and in a direction towards the combustion engine. When the particles are released from the filter 3, the particles are transported from the filter surface to the collecting vessel 9. In a preferred embodiment of the invention, in order to allow transport of the particulate from the filter 3 to the collecting vessel 9, the filter 3 is placed in a portion 10 of the exhaust pipe 2 exhibiting a local direction of extension (indicated by the arrow marked 11) which forms an angle with horizontal in excess of sixty degrees.

In an even more preferred embodiment, the local direction of extension 11 is eighty-five and ninety degrees relative to horizontal. In this regard, such a measurement is intended to be performed when the exhaust pipe is installed in a condition intended for use and, in the case where the combustion engine is installed in a vehicle, when the vehicle is placed on level ground. Positioning the filter in this type of position and location (substantially above the collecting vessel 9) will allow particles that have been released from the filter to be transported towards the collecting vessel 9 under the influence of gravity. In order to ensure that the particles fall down into the collecting vessel 9, the vessel is located "downstream" of the filter with respect to gravity flow.

Since the tone generator generates an oscillating air stream, the tone generator will also contribute to transporting the particles away when they have been released from the filter surface. An oscillating air stream does not exhibit any average transport direction when forming a time average for one or several time periods. However, the concentration of particulate that prevails at the filter wall when initiating the cleaning process will, in real time, very rapidly, gradually be equalized so that the particle concentration, with the exception of effects resulting from the formation of stationary waves in the system, become substantially homogenous within the region where the oscillation takes place. This results in a transport of particles away from the filter surface 3 in a direction towards the collecting vessel 9 by means of the tone generator 5.

Accordingly, in a preferred embodiment of the invention, the collecting vessel 9 is positioned in such a way that a main portion of the region 12 located downstream of the collecting vessel 9 exhibits a local direction of extension that forms an angle with horizontal in excess of sixty degrees, and which is preferably between eighty-five and ninety degrees away from horizontal.

Figure 3:
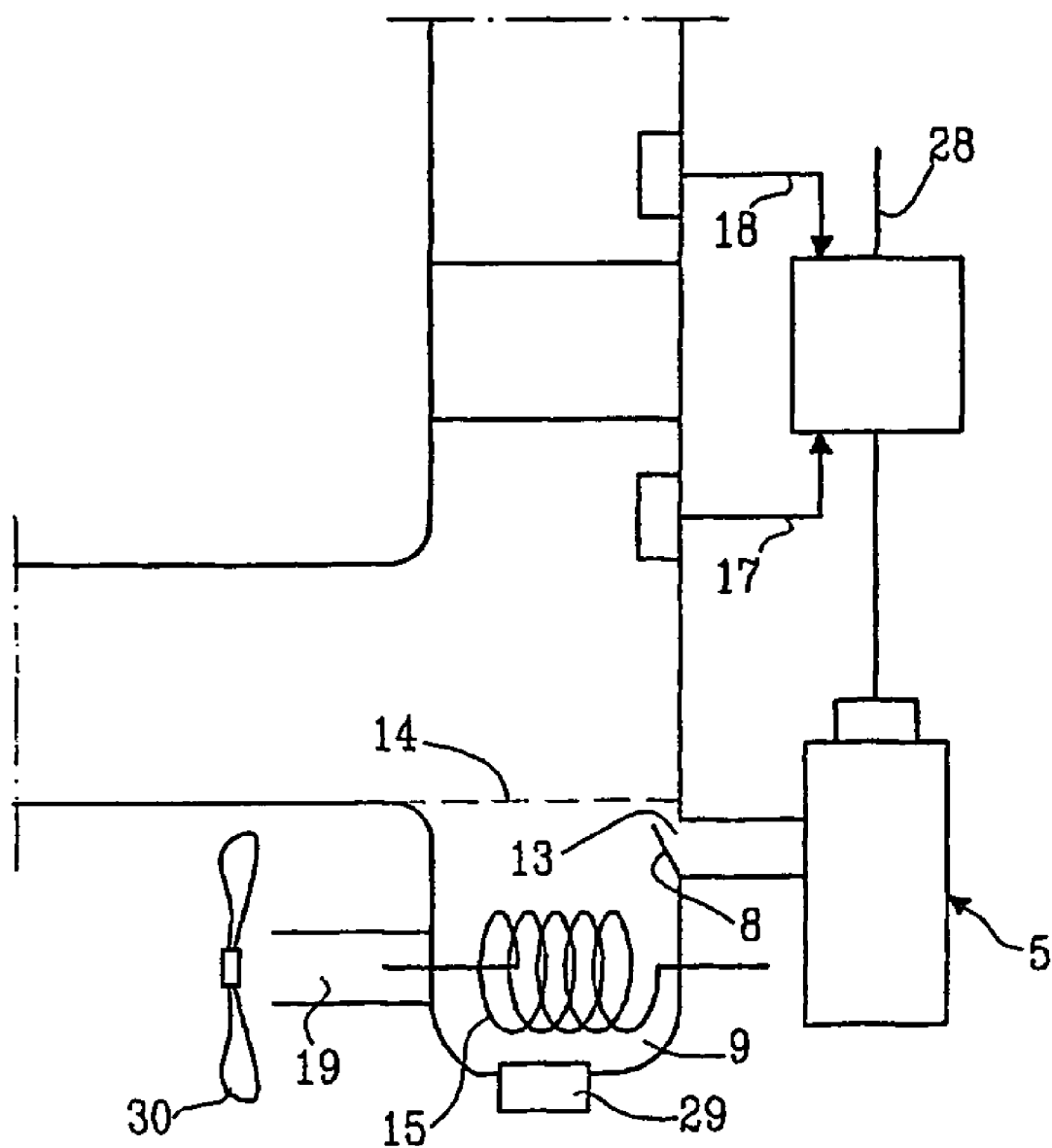
FIG. 3 shows an embodiment of the invention in which the switching-on or actuation of the tone generator takes place based on information concerning the pressure drop being experienced across the filter.

In one embodiment of the invention, and that is demonstrated in FIG. 3, the outlet 13 from the tone generator 5 is placed in direct connection with the collecting vessel 9 and behind a perforated structure 14, for example a screen, which allows passage of the particles into the vessel 9. The perforated structure 14 reduces the risk of the exhaust gas flow carrying particles from the collecting vessel 9 during normal operation and thereby returning them to the filter 3. By positioning the outlet 13 from the tone generator behind the perforated structure 14, a more protected location of the tone generator 5 is obtained, and a smaller influence by the tone generator is obtained in normal operation of the combustion engine.

In the embodiment of the invention exemplified in FIG. 3, the transport of released particles away from the filter wall is constituted by an evacuating duct 19, connected to the collecting vessel in which a negative pressure is created by such means as a fan 30.

Preferably, the collecting vessel 9 is provided with a device 15 that causes combustion of the soot particles in the collecting vessel 9. This device 15, for example, can be constituted by an electric coil.

Furthermore, FIG. 1 shows a control computer 16 that is intended to control the switching-on and the switching-off of the tone generator 5, and, whenever applicable, opening and closing of valves 8 arranged to open and close the communicating duct 7 between the tone generator 5 and the exhaust pipe 2. In one embodiment of the invention, the tone generator 5 is activated as a function of the mileage of a vehicle driven by the combustion engine. In an alternative embodiment, a pressure drop across the filter 3 can be measured, for example by means of the paired pressure sensors 17, 18, one each located upstream and downstream of the filter 3.

Figure 2B:
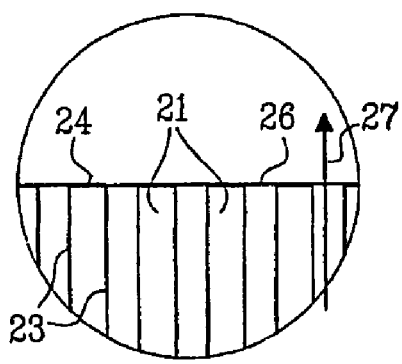
FIGS. 2a and 2b each show a representative detail of a design of a membrane present in the particle filter.
Figure 2A:
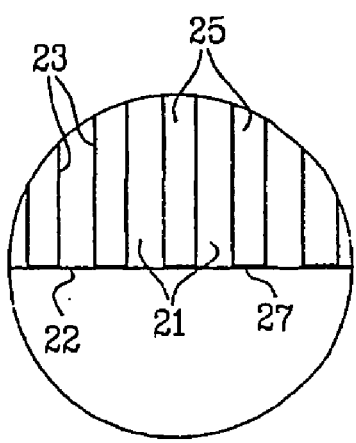

FIGS. 2a and 2b demonstrate, in detail, an exemplary structure of the filter 3. This exemplary filter 3 includes a membrane permeable to gas components generated by a combustion process in the combustion engine, but which is impermeable to soot and ash particles generated by the same combustion process. The membrane is constituted of a first set of channels 21, each exhibiting an open inlet 22, side walls 23 and a closed end wall 24, and a second set of channels 25, each exhibiting an open outlet 26, side walls 23 and a closed end wall 27, wherein the exhaust gas flow from the combustion engine is intended to be guided from the first set of channels 21 to the second set of channels 25 via the side walls 23.

The first set of channels 21 preferably is installed with a local direction of extension 27 that forms an angle with the horizontal plane that exceeds 60 degrees. In another preferred embodiment of the invention, the local direction of extension 27 of the first set of channels forms an angle with the horizontal plane that is between 85 and 90 degrees.

In an alternative embodiment of the invention, the tone generator is constituted solely by a resonance circuit resonated to the desired frequency. In this case, the resonance circuit is driven by means of the exhaust gas flow of the combustion engine. Thereby, the resonance circuit has to be disconnected from the exhaust pipe in normal operation, and has to communicate with the exhaust pipe during the process of cleaning the filter. For this reason, a resonance chamber 6 is connected to the exhaust pipe via a wave-guide 7. Furthermore, the exhaust pipe 2, or alternatively the waveguide, exhibits a valve that allows the duct between the resonance chamber 6 and the exhaust pipe 2 to be opened or closed.

The control unit 16 also includes an input channel 28 for receiving information about the operational condition of the combustion engine and, whenever applicable, about the vehicle driven by the combustion engine. In one embodiment of the invention, the tone generator is activated only under predetermined operational conditions of the vehicle, preferably, when idling or when the engine is switched off. In order to ensure that the particles are brought from the filter 3 to the collecting vessel 9, it is of importance that the volume flow in the exhaust pipe is not too large. Should an electrical tone generator be utilized, the cleaning process preferably takes place with the engine switched off, and should the tone generator be constituted of a resonance chamber activated by means of the exhaust gas flow, the cleaning process preferably takes place when idling.

Preferably, the cleaning process takes place with an oscillating air stream having a period below 100 Hz, and in further preferred cleaning processes having a period below 50 Hz, 40 Hz and 20 Hz respectively. Preferably, the cleaning process takes place at an acoustic pressure between 50 and 150 dB.

Furthermore, in a preferred embodiment, the collecting vessel 9 is provided with a service hatch 29 through which ash, and whenever applicable soot particles, are removed. Also, the resonance chamber 6 can be provided with such an inspection hatch.

The invention is not limited to the above-described embodiments, but may be varied within the scope of the appended claims. For example, the pressure sensors, the evacuating duct and the location of the outlet from the wave-guide into the exhaust pipe, mentioned in connection with FIGS. 1 and 3, can be freely combined. Furthermore, the tone generator can be placed downstream the particle filter.

The invention claimed is:

1. An arrangement for a combustion engine in communication with an exhaust pipe, said arrangement comprising:
   an exhaust pipe having a particle filter located therein and having a membrane that is permeable to gas components generated by a combustion process of a combustion engine and impermeable to soot and ash particles generated by the combustion process; and
   an infrasonic tone generator connected to said exhaust pipe and associated with said particle filter so that said infrasonic tone generator generates an oscillating air stream that acts upon said membrane of said particle filter during a filter cleaning process that releases soot and ash particles from said particle filter.

2. The arrangement as recited in claim 1, further comprising:
   a collecting vessel is arranged in said exhaust pipe upstream and in direct connection with said filter for collecting released soot and ash particles.

3. An arrangement for a combustion engine in communication with an exhaust pipe, said arrangement comprising:
   an exhaust pipe having a particle filter located therein and having a membrane that is permeable to gas components generated by a combustion process of a combustion engine and impermeable to soot and ash particles generated by the combustion process;
   a collecting vessel is arranged in said exhaust pipe upstream and in direct connection with said filter for collecting released soot and ash particles; and
   a tone generator connected to said exhaust pipe and configured so that an oscillating air stream generated by said tone generator during a cleaning process releases soot and ash particles from said filter and wherein said membrane and said collecting vessel are positioned in said exhaust pipe in such a way that, when a particle is released from the membrane, transport of said particle from the membrane to the collecting vessel is enabled.

4. The arrangement as recited in claim 3, wherein said membrane is positioned in a portion of said exhaust pipe exhibiting a local direction of extension which forms an angle with the horizontal plane which exceeds 60 degrees.

5. The arrangement as recited in claim 4, wherein said local direction of extension forms an angle with the horizontal plane which is between 85 and 90 degrees.

6. An arrangement for a combustion engine in communication with an exhaust pipe, said arrangement comprising:
   an exhaust pipe having a particle filter located therein and having a membrane that is permeable to gas components generated by a combustion process of a combustion engine and impermeable to soot and ash particles generated by the combustion process; and
   a tone generator connected to said exhaust pipe and configured so that an oscillating air stream generated by said tone generator during a cleaning process releases soot and ash particles from said filter and wherein said membrane is constituted by a first set of channels, each exhibiting an open inlet, side walls and a closed end wall, and a second set of channels, each exhibiting an open outlet, side walls and a closed end wall, wherein the exhaust gas flow from the combustion engine is intended to be guided from the first set of channels to the second set of channels via said side walls, and said first set of channels exhibits a local direction of extension forming an angle with the horizontal plane which exceeds 60 degrees.

7. The arrangement as recited in claim 1, wherein said infrasonic tone generator is adapted to generate infrasonic sound having a frequency below 20 Hz in said cleaning process.

8. The arrangement as recited in claim 1, wherein said infrasonic tone generator is electrically driven.

9. The arrangement as recited in claim 1, wherein said infrasonic tone generator is constituted by a resonance circuit which is driven by means of the gas flow generated by the combustion engine.

10. A method for cleaning a membrane particle filter located in an exhaust pipe associated with a combustion engine, said method comprising generating an oscillating air stream using an infrasonic tone generator and said generated oscillating air stream acting upon said membrane particle filter and thereby releasing soot and ash particles from said filter with infrasonic sound during a cleaning process of said filter.

11. The method as recited in claim 10, wherein said particles released from the particle filter are transported away from the filter to a collecting vessel.

12. The method as recited in claim 11, wherein said transport of said particles from the particle filter to the collecting vessel primarily takes place by means of the influence of gravity on the particles.

13. The method as recited in claim 11, wherein said transport from the particle filter to the collecting vessel at least partially takes place by means of the oscillating air stream from the infrasonic tone generator.

14. The method as recited in claim 10, wherein said infrasonic tone generator generates a sound having a frequency below 40 Hz.

15. The method as recited in claim 10, wherein said infrasonic tone generator generates a sound having a frequency below 20 Hz.

16. A method for cleaning a membrane particle filter located in an exhaust pipe associated with a combustion engine, said method comprising generating an oscillating air stream by a tone generator and releasing soot and ash particles from said filter by means of an infrasonic sound wherein switching-on and switching-off of the tone generator is controlled by a control computer.

17. The method as recited in claim 16, wherein said control computer obtains information about the mileage of a vehicle driven by said combustion engine, and the tone generator is activated at regular intervals with respect to the mileage.

18. A method for cleaning a membrane particle filter located in an exhaust pipe associated with a combustion engine, said method comprising generating an oscillating air stream by a tone generator and releasing soot and ash particles from said filter by means of an infrasonic sound, and wherein said tone generator generates a sound having a frequency below 20 Hz and a control computer collects information concerning the pressure drop across the filter, and the tone generator is activated when the pressure drop across the filter exceeds a certain threshold value.

19. The method as recited in claim 16, wherein said tone generator is activated when the combustion engine is idling.

20. The method as recited in claim 16, wherein said tone generator is activated when the combustion engine is switched off.

* * * * *